United States Patent
Meng et al.

(10) Patent No.: US 7,615,969 B2
(45) Date of Patent: Nov. 10, 2009

(54) SYSTEMS AND METHODS FOR TEMPERATURE-DEPENDENT BATTERY CHARGING

(75) Inventors: Changhong Meng, Austin, TX (US); Youssef Daou, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 339 days.

(21) Appl. No.: 11/494,192

(22) Filed: Jul. 27, 2006

(65) Prior Publication Data

US 2008/0024089 A1 Jan. 31, 2008

(51) Int. Cl.
*H02J 7/04* (2006.01)
*H02J 7/00* (2006.01)
*H01M 2/00* (2006.01)
*H01M 10/50* (2006.01)

(52) U.S. Cl. .................. 320/150; 320/154; 320/160; 429/61; 429/62

(58) Field of Classification Search .................. 320/150
See application file for complete search history.

(56) References Cited

U.S. PATENT DOCUMENTS

| | | | |
|---|---|---|---|
| 3,917,990 A * | 11/1975 | Sherman, Jr. ................ | 320/150 |
| 5,410,238 A | 4/1995 | Ishizuka et al. | |
| 5,773,956 A | 6/1998 | Wieczorek | |
| 6,075,347 A | 6/2000 | Sakakibara | |
| 6,204,641 B1 | 3/2001 | Sakakibara | |
| 6,392,385 B1 | 5/2002 | Barker et al. | |
| 6,433,517 B2 | 8/2002 | Sakakibara | |
| 6,563,290 B2 | 5/2003 | Sakakibara et al. | |
| 6,603,288 B2 * | 8/2003 | Sakakibara ................ | 320/151 |
| 6,771,050 B2 | 8/2004 | Yamashita | |
| 6,928,381 B2 | 8/2005 | Becker-Irvin et al. | |
| 2001/0009362 A1 | 7/2001 | Sakakibara | |
| 2002/0079867 A1 | 6/2002 | Sakakibara et al. | |
| 2002/0167295 A1 | 11/2002 | Yamashita | |
| 2002/0175659 A1 | 11/2002 | Sakakibara | |
| 2005/0137823 A1 | 6/2005 | Becker-Irvin et al. | |

FOREIGN PATENT DOCUMENTS

| | | | |
|---|---|---|---|
| JP | 03222634 A | 10/1991 | |
| JP | 04255433 A | 9/1992 | |
| JP | 11252814 A | 9/1999 | |

OTHER PUBLICATIONS

PowerStream "Sealed Lead Acid Battery Charging Basics", Printed From Internet Jun. 19, 2006, 7 pgs.
Unitrode Application Note, "Improved Charging Methods For Lead-Acid Batteries Using The UC3906", U-104, 1999, 12 pgs.
Ramsey Electronics Model No. LABC1, "Lead Acid Battery Charger Kit", 2001, 24 pgs.

* cited by examiner

*Primary Examiner*—Patrick J Assouad
*Assistant Examiner*—Yalkew Fantu
(74) *Attorney, Agent, or Firm*—O'Keefe, Egan, Peterman & Enders LLP

(57) ABSTRACT

Systems and methods for controlling battery cell charge current based on the ambient temperature conditions to which battery cell/s of a battery are exposed, for example, to control battery cell charging current for battery systems that may be exposed to environments where ambient temperature conditions are not controllable.

29 Claims, 10 Drawing Sheets

SYSTEMS AND METHODS FOR TEMPERATURE-DEPENDENT BATTERY CHARGING

BACKGROUND OF THE INVENTION

1. Field of the Invention

This invention relates generally to batteries, and more particularly to temperature-dependent charging of batteries.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of portable information handling systems include notebook computers. These portable electronic devices are typically powered by battery systems such as lithium ion ("Li-ion") or nickel metal hydride ("NiMH") battery packs including one or more rechargeable batteries. FIG. 1 shows a battery system 120 of a portable information handling system 100 having battery charge terminals 122, 124 that are temporarily coupled to corresponding charge output terminals 115, 116 of a battery charging apparatus 110. As so configured, battery charging apparatus 110 is coupled to receive current from current supply terminals 112, 114 (e.g., alternating current, or direct current from an AC adapter) and to provide DC charging current to battery charge terminals 122, 124 of battery system 120 via charge output terminals 115, 116. As shown, battery system 120 also includes battery system data bus (SMBus) terminals 126, 128 for providing battery state information, such as battery voltage, to corresponding battery charging apparatus data bus terminals 117, 118.

FIG. 2 shows a conventional lithium ion battery system 120 having a battery management unit ("BMU") 202 responsible for monitoring battery system operation and for controlling battery system charge and discharge circuitry 270 that is present to charge and discharge one or more battery cells of the battery system. As shown, BMU 202 includes analog front end ("AFE") 206 and microcontroller 204. Charge and discharge circuitry 270 of battery system 120 includes two field effect transistors ("FETs") 214 and 216 coupled in series between battery charge terminal 112 and battery cell/s 224. FET 214 is a charge FET ("C-FET") switching element that forms a part of charge circuit 260 that is controlled by microcontroller 204 and/or AFE 206 of BMU 202 using switch 218 to allow or disallow charging current to the lithium ion battery cell/s 224, and FET 216 is a discharge FET ("D-FET") switching element that forms a part of discharge circuit 262 coupled in series with charge circuit 260 that is controlled by microcontroller 204 and/or AFE 206 of BMU 202 using switch 220 to allow or disallow discharge current from the battery cell/s 224. As shown, parasitic diodes are present across the source and drain of each FET switching element, i.e., to conduct charging current to the battery cell/s when the discharge FET switching element 216 is open, and to conduct discharging current from the battery cell/s when the charge FET switching element 214 is open.

During normal battery pack operations both charge and discharge FET switching elements 214 and 216 are placed in the closed state by respective switches 218 and 220, and AFE 206 monitors voltage of battery cell/s 224. If AFE 206 detects a battery over-voltage condition, BMU 202 opens the charge FET switching element 214 to prevent further charging of the battery cell/s until the over-voltage condition is no longer present. Similarly, if AFE 206 detects a battery under-voltage (or over-discharge) condition, BMU 202 opens the discharge FET switching element 216 to prevent further discharging of the battery cell/s until the under-voltage condition is no longer present. BMU 202 may also open the charge FET switching element 214 when the battery pack is in sleep mode.

A current sense resistor 212 is present in the battery pack circuitry to allow AFE 206 to monitor charging current to the battery cell/s. If the charge FET switching element 214 is supposed to be open (e.g., during sleep mode or battery over-voltage condition) but charging current is detected, BMU 202 permanently disables the battery pack by blowing an inline fuse 222 present in the battery circuitry to open the battery pack circuitry and prevent further over-charging. A thermistor 211 is present in the battery pack circuitry to allow AFE 206 to sense temperature of battery cell/s 224 for purposes of shutting down charging operations when temperature of battery cell/s 224 either exceeds a maximum allowable charging temperature or drops below a minimum allowable charging temperature.

FIG. 3 shows a battery charging apparatus 110 coupled to a conventional smart battery system 120 for a notebook computer. As shown, charging apparatus 110 includes charger circuitry 304 that is coupled to receive current from current supply terminals 112, 114, and to provide DC charging current to battery charge terminals 122, 124 of battery system 120 via charge output terminals 115, 116. Also shown is notebook computer system load 330 that is coupled to receive power from battery system 120 via coupled terminals 122 and 115. Charger circuitry includes charger regulation circuitry such as an analog controller with some digital functionality, and is configured to communicate with BMU 202 and/or through system BIOS of the notebook computer. BMU 202 controls battery system charge and discharge circuitry 270 based on system operating conditions. As shown in FIG. 3, battery system 120 includes SMBus terminals 126, 128 for providing battery state information, such as battery voltage and current, via battery charging apparatus data bus terminals 117, 118 to system embedded controller/keyboard controller (EC/KBC) 331.

Battery life (discharge time) is one important performance factor for users of notebook computers, and user dissatisfaction often results from shortened battery life. Shortened battery life typically becomes an increasingly significant problem as battery capacity degrades over multiple charge/discharge cycles. Many conventional notebook computer systems use Constant Current-Constant Voltage (CC-CV) charging mechanisms, where the constant current (CC) and constant voltage (CV) values are pre-determined.

Ambient temperature plays a role in battery capacity degradation, which is greater at higher and lower ambient temperatures than under normal room temperature ambient conditions. In particular, new battery capacity degradation is much more severe in cold environments than in room temperature or hot ambient temperature environments, and this effect may be seen in battery charge/discharge life cycle testing. Due to this effect of higher battery capacity degradation, much greater battery capacity degradation is tolerated by battery manufacturers and notebook computer manufacturers at cold ambient temperatures than at normal ambient temperatures. However, despite meeting battery specifications at cold ambient temperatures, notebook computer users find such a large reduction in battery capacity inconvenient.

SUMMARY OF THE INVENTION

Disclosed herein are systems and methods for controlling battery cell charge current based on the ambient temperature conditions to which battery cell/s of a battery are exposed. The disclosed systems and methods may be advantageously implemented in one embodiment to control battery cell charging current for battery systems that may be exposed to environments where ambient temperature conditions are not controllable. Examples of such battery systems include, but are not limited to, battery systems of portable information handling systems (e.g., notebook computers) that may be transported and therefore potentially utilized in a wide variety of interior environments (office, home, airplane, automobile, etc.) and exposed exterior environments (e.g., under winter and summer conditions, etc.) of varying geographical location and under varying weather conditions. In such an embodiment, the disclosed systems and methods may utilize the controllable variable of battery cell charging current to reduce the negative impact on battery cell capacity caused by the uncontrollable variable of battery cell ambient operating temperature.

The disclosed systems and methods may be advantageously implemented in one embodiment to at least partially mitigate battery cell capacity degradation that occurs due to adverse ambient temperature conditions and to thus extend battery cell cycle life. Such adverse ambient temperature conditions may be any temperature that battery cell/s are exposed to that is either hotter or colder than a default ambient operating temperature or temperature range for the battery cell/s, and that results in lower capacity of the battery cell/s as compared to the capacity of the battery cell/s at the default ambient operating temperature or temperature range. In one embodiment, the disclosed systems and methods may be implemented to control charging current for a battery system of a portable information handling system (e.g., such as notebook computer). In such an embodiment, capacity of the battery system may be advantageously maximized under conditions of uncontrolled temperature environments (e.g., both hot and cold temperature environments) to which battery cell/s of the portable information handling system may be subjected, and which have negative impact on capacity of battery cell/s of conventional battery systems.

In one exemplary embodiment, the disclosed systems and methods may be implemented as a temperature-dependent current regulation algorithm that implements a plurality of charge current control values (e.g., as a continuous function) based on a sensed temperature that is representative of ambient temperature conditions to which battery cell/s are exposed. Such a multiple-point current regulation algorithm may be advantageously implemented to provide increased mitigation to battery cell degradation under adverse ambient temperature conditions as the adversity of the temperature conditions increases, e.g., as the ambient temperature conditions become increasingly hot or cold relative to a default battery cell operating temperature or temperature range. In one exemplary embodiment, the disclosed systems and methods may be implemented to control the magnitude of battery cell charge current (e.g., battery cell charge current output) using logic implemented in software or firmware (e.g., BIOS) of a portable information handling system and/or smart battery system without requiring specially designed hardware. For example, charge current may be reduced when a cold ambient temperature environment is detected.

In one respect, disclosed herein is a method of controlling charge current provided to one or more battery cells during a charge cycle, including: sensing a temperature representative of an ambient temperature to which the one or more battery cells are exposed during the charge cycle; determining a value of charge current to be provided to the one or more battery cells during the charge cycle using a temperature-dependent current regulation algorithm and based on the sensed temperature; and providing the determined value of charge current to the one or more battery cells as a constant charge current during the charge cycle. The temperature-dependent current regulation algorithm may include a plurality of charge current control values, may be implemented by software, or may be a combination thereof.

In another respect, disclosed herein is a method of minimizing battery capacity degradation by controlling charge current provided to one or more battery cells during a charge cycle, including: determining a value of charge current to be provided to the one or more battery cells during the charge cycle based on a temperature representative of an ambient temperature to which the one or more battery cells are exposed; and providing the determined value of charge current to the one or more battery cells during the charge cycle. The determined value of charge current may include a first charge current value if the sensed temperature corresponds to a first given temperature, may include a second charge current value if the sensed temperature corresponds to a second given temperature, with the first given temperature being greater than the second given temperature, and with the first value of charge current being less than the second value of charge current. The first charge current value may be a charge current value at which a magnitude of degradation of the capacity of the one or more battery cells at the first given temperature is reduced over a given number of multiple charge cycles as compared to a magnitude of degradation of the capacity of the one or more battery cells experienced at the second charge current value and at the first given temperature over the same the given number of multiple charge cycles.

In another respect, disclosed herein is a battery charging system configured to be coupled to one or more battery cells, the battery charging system including: a battery charging current source configured to provide controllable and variable charging current to the one or more battery cells; and control logic configured to determine a value of charge current to be provided to the one or more battery cells during a charge cycle using a temperature-dependent current regulation algorithm and based on a sensed temperature representative of ambient temperature to which the one or more battery cells are exposed during the charge cycle. The control logic may be configured to control the battery charging current source to provide the determined value of charge current to the one or more battery cells as a constant charge current during the charge cycle, and the temperature-dependent current regulation algorithm may include a plurality of charge current control values, may be implemented by software, or a combination thereof.

In another respect, disclosed herein is a battery charging system configured to be coupled to one or more battery cells, the battery charging system including: a battery charging current source configured to provide controllable and variable charging current to the one or more battery cells; and control logic configured to determine a value of charge current to be provided to the one or more battery cells during the charge cycle based on a temperature representative of an ambient temperature to which the one or more battery cells are exposed, and to provide the determined value of charge current to the one or more battery cells during the charge cycle. The determined value of charge current may include a first charge current value if the sensed temperature corresponds to a first given temperature, and may include a second charge current value if the sensed temperature corresponds to a second given temperature, the first given temperature being greater than the second given temperature, and the first value of charge current being less than the second value of charge current. The first charge current value may be a charge current value at which a magnitude of degradation of the capacity of the one or more battery cells at the first given temperature is reduced over a given number of multiple charge cycles as compared to a magnitude of degradation of the capacity of the one or more battery cells experienced at the second charge current value and at the first given temperature over the same the given number of multiple charge cycles.

DESCRIPTION OF ILLUSTRATIVE EMBODIMENTS

Figure 4:
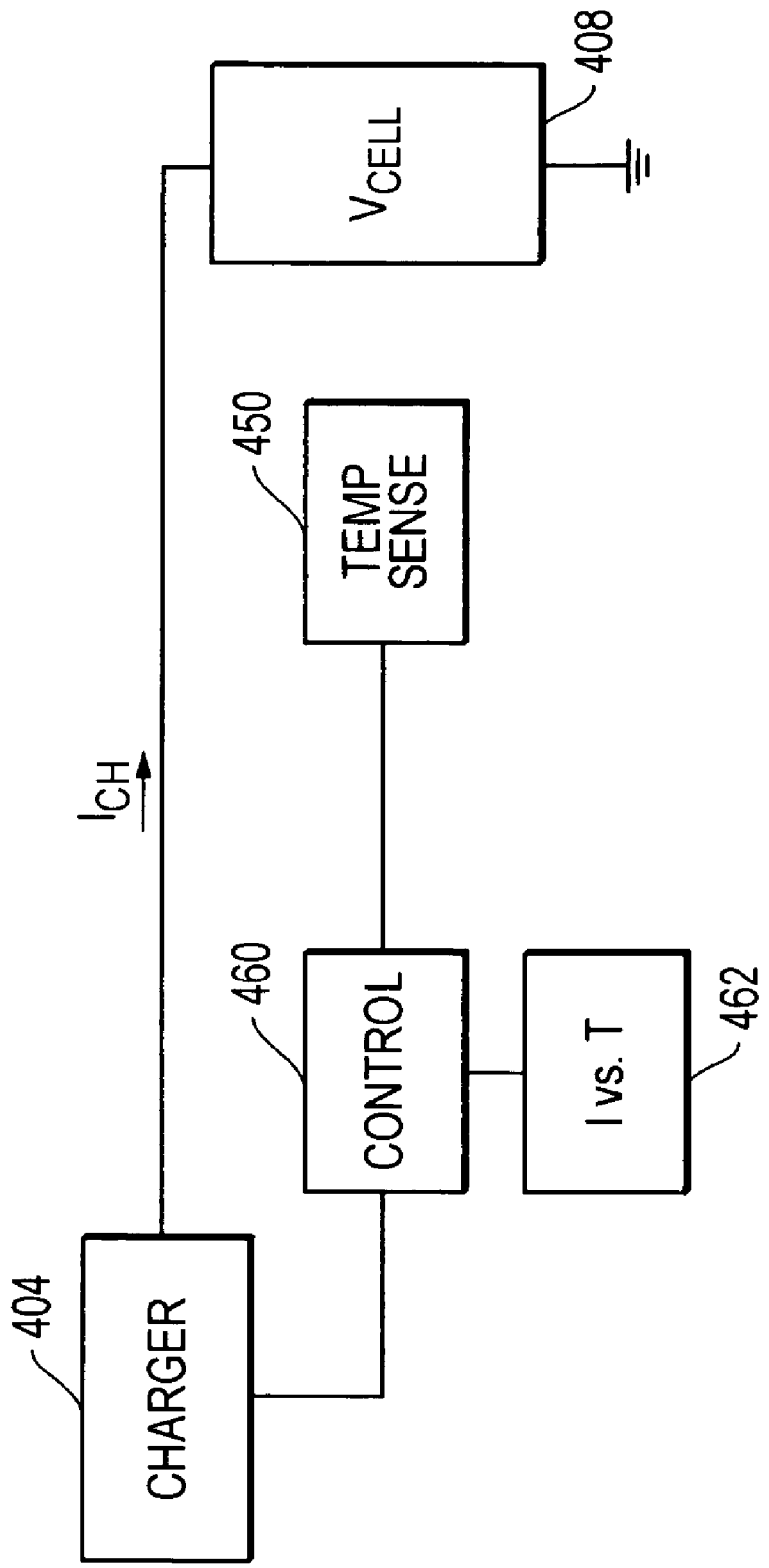
FIG. 4 is a block diagram of a battery and battery charging system according to one exemplary embodiment of the disclosed systems and methods.

FIG. 4 shows a battery and battery charging system according to one exemplary embodiment of the disclosed systems and methods. In FIG. 4, one or more battery cell/s 408 are coupled to a battery charging current source 404 that supplies charging current (Ich) to battery cell/s 408. As described further herein, battery cell/s 408 may be, for example, a component of a smart battery system that is capable of sensing and providing voltage information or other information about its own operating condition, or may be part of a dumb battery system. Also shown in FIG. 4 is control logic 460 that is configured to control charging current output of a controllable battery charging current source 404 based on temperature information representative of ambient temperature which is received from temperature sensor 450 in combination with a current/temperature relationship 462 that represents a defined relationship between charge current magnitude and the sensed temperature received from temperature sensor 450. In this regard, control logic 460 may be implemented as a controller (e.g., processor and associated software, for example, ROM-based software such as firmware) or using any other suitable configuration of hardware, microcontroller/microprocessor, firmware and/or software that interfaces with other illustrated components of FIG. 4 in the manner described herein. Current/temperature relationship 462 may be present, for example, as information stored in any memory device/s suitable for storing such information including, but not limited to, non-volatile memory, volatile memory, magnetic or optical memory disk/s, etc. For purposes of illustration and description, FIG. 4 shows the tasks of control logic 460, temperature sensor 450 and current/temperature relationship 462 as three separate components. However, it will be understood that the tasks of control logic 460, temperature sensor 450 and current/temperature relationship 462 may implemented by a single component or by any combination of two or more components that is suitable for accomplishing temperature-dependent charging of batteries in a manner as described elsewhere herein.

In the implementation of the embodiment of FIG. 4, battery cell/s 408 may be temporarily or permanently coupled to receive charging current Ich from battery charging current source 404, which may be any device suitable for providing controllable and variable charging current to battery cell/s 408. In one embodiment, temperature sensor 450 may be any device suitable for sensing temperature representative of ambient temperature to which battery cell/s 408 are exposed and for providing a signal representative of the sensed temperature to control logic 460, e.g., a thermocouple sensor disposed adjacent battery cell/s 408, a thermistor of a smart battery pack, etc. A temperature representative of ambient temperature may be either the actual ambient temperature to which battery cell/s 408 is exposed, or may be a temperature of a component (e.g., battery cell/s 408 or other information handling system component) as this temperature is affected by the ambient temperature to which the battery cell/s 408 are exposed. For example, temperature of battery cell/s 408 may be sensed prior to initiating a charging cycle that will result in warming of the battery cell/s 408. Thus, under pre-charge cycle conditions, the sensed temperature of battery cell/s 408 depends on the ambient temperature to which the battery cell/s 408 are exposed and thus is representative of the ambient temperature to which the battery cell/s 408 are exposed.

Still referring to the embodiment of FIG. 4, temperature sensor 450 may be configured to sense temperature of battery cell/s 408 or other information handling system component (e.g., motherboard, CPU, etc.), or alternatively may be configured for directly sensing ambient temperature of the external environment (e.g., external ambient air temperature) to which battery cell/s 408 are exposed. Furthermore, temperature sensor 450 may be disposed in any position relative to battery cell/s 408 that is suitable for sensing temperature of battery cell/s 408 or other information handling system component, or alternatively for directly sensing ambient temperature to which battery cell/s 408 are exposed, e.g., disposed adjacent to battery cell/s of a dumb or smart or battery in integrated or non-integrated manner, integrated into a battery pack of portable information handling system, integrated into a portable information handling system that includes a removable or portable battery pack, etc. As described elsewhere herein, current/temperature relationship 462 may be a temperature-dependent current regulation algorithm that is configured to provide charge current control values to control logic 460 based on temperature sensed by temperature sensor 450.

In one embodiment, the disclosed systems and methods may be implemented for charging batteries of a portable information handling system, such as notebook computer. Besides notebook computers, other examples of such portable electronic devices include, but are not limited to, portable telephone devices (e.g., cellular phones, cordless phones, etc.), personal digital assistant ("PDA") devices, MP3 players, cameras, medical devices, computer peripherals, etc. In addition to portable electronic devices, it will be understood that the disclosed systems and methods may be implemented to power any other type of electronic device or system load that is at least partially battery powered and that has electronic circuitry that is coupled to receive current from a battery system. In this regard, the disclosed systems and methods may be advantageously implemented in portable or non-portable (e.g., server backup battery) system applications where smart batteries are employed. In one exemplary embodiment, battery system 420 may be configured as a smart battery system for a portable information handling system. However, it will be understood that the disclosed systems and methods may be also be implemented to control charging operations for dumb battery systems (i.e., battery systems configured to be controlled externally rather than internally).

Figure 5:
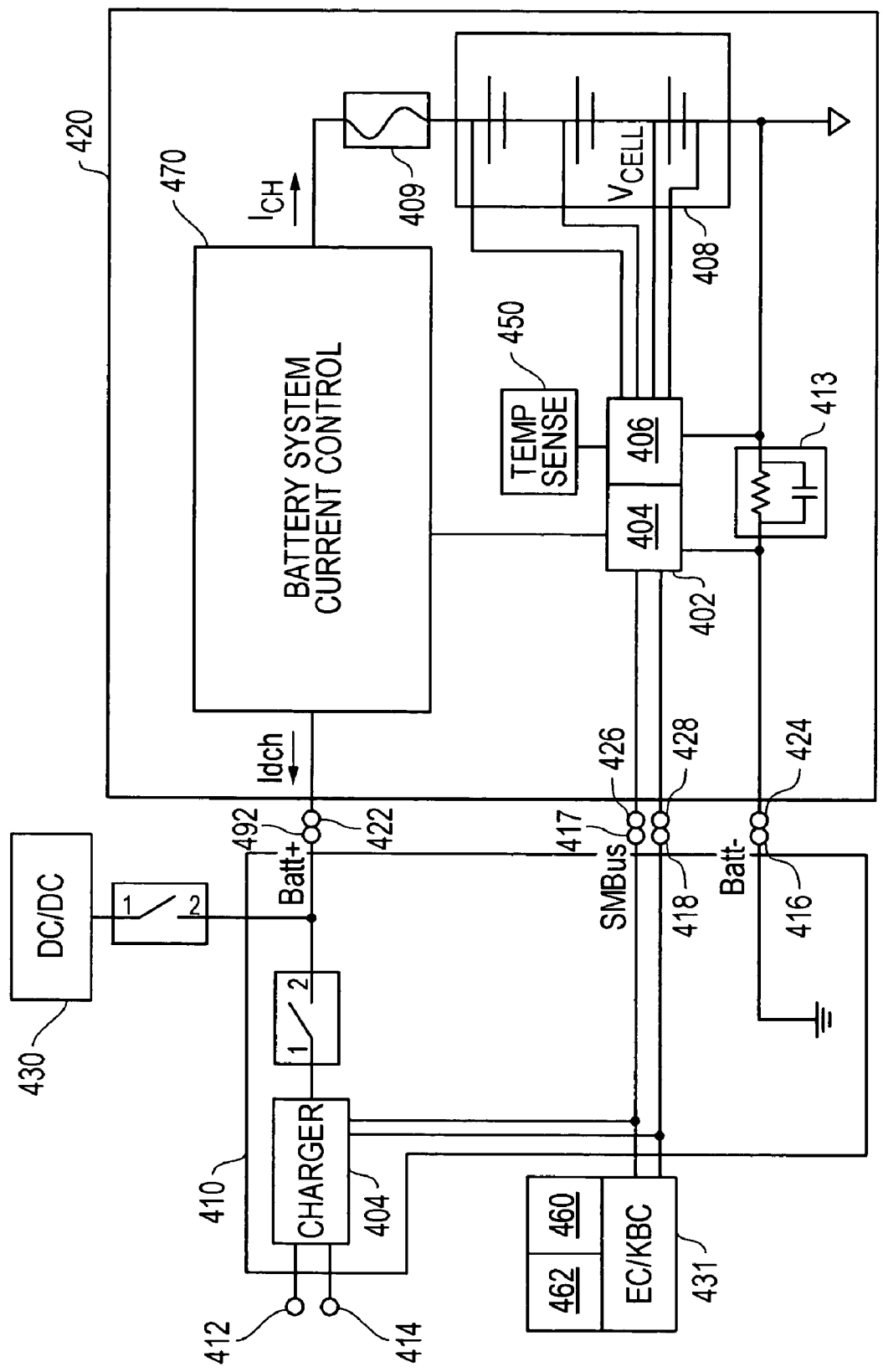
FIG. 5 is a block diagram of a battery system and coupled battery charging apparatus according to one exemplary embodiment of the disclosed systems and methods.

FIG. 5 shows one exemplary embodiment of the disclosed systems and methods in which a smart battery system 420 is coupled to a battery charging apparatus 410. Battery system 420 may be configured as a stand alone source of DC current, or may be provided as a permanent or replaceable component of a portable electronic device (e.g., battery pack of a portable information handling system such as a notebook computer). As shown in FIG. 5, battery system 420 includes one or more battery cell/s 408 coupled to battery system terminal 422 that is coupled to a system load 430 and battery charging apparatus 410. It will be understood that when battery system 420 is provided as an integrated component of an electronic device, a corresponding battery charging apparatus and/or system load may also be provided as integrated parts of the same electronic device, or may be provided as external devices to the electronic device.

Battery cell/s 408 of FIG. 5 may be any type of rechargeable battery cell/s or combination thereof. Examples of such battery cells include, but are not limited to, Li-ion battery cells, NiMH battery cells, nickel cadmium (NiCd) battery cells, lithium-polymer (Li-polymer) battery cells, etc. As shown, charging apparatus 410 includes battery charging current source that includes circuitry coupled to receive current from current supply terminals 412, 414 (e.g., from AC adapter), and to provide DC charging current Ich to battery system terminals 422, 424 of battery system 420 via charge output terminals 492, 416. Also shown is system load 430 (e.g., notebook computer system load) that is coupled to receive power from battery system 420 via coupled battery system terminals 422 and 424.

In the embodiment of FIG. 5, battery charging current source 404 may be, for example, a battery charger that includes charger regulation circuitry such as an analog controller with some digital functionality, and may be configured to communicate with BMU 402 of smart battery system 420 and system BIOS (e.g., running on EC/KBC 431) of the notebook computer. Battery system 420 includes SMBus terminals 426, 428 for providing battery state information, such as battery system voltage, battery system current, and battery system sensed temperature via battery charging apparatus data bus terminals 417, 418 to system embedded controller/keyboard controller (EC/KBC) 431.

In the illustrated embodiment, battery management unit (BMU) 402 is responsible for monitoring battery system operation (e.g., monitoring voltage, current, temperature, etc.) and for controlling battery current control circuitry 470, although any other suitable configuration of circuitry, processor/s and/or control logic may be employed in other embodiments. In the embodiment of FIG. 5, BMU 402 includes AFE 406 and microcontroller 404, although other embodiments are possible. In this embodiment, battery current control circuitry 470 is controlled by microcontroller 404 and/or AFE 406 of BMU 402 to allow or disallow current flow (Ich and Idch) from and to battery cell/s 408. Also shown in FIG. 5 are current sense resistor 413 that may be present to allow BMU to monitor charging current to the battery cell/s, and inline fuse 409 that may be present to prevent over-charging. BMU 402 is also shown as shown to monitor voltage of battery cell/s 424. Battery system also includes temperature sensor 450 that is present for sensing temperature representative of ambient temperature to which battery cell/s 408 are exposed and providing a signal representative thereof to BMU 402.

Still referring to FIG. 5, control logic 460 and current/temperature relationship 462 are provided in this exemplary embodiment as a part of EC/KBC 431, although it will be understood that features of control logic 460 and/or current/temperature relationship 462 may be implemented on components separate from EC/KBC 431. In operation, EC/KBC 431 receives sensed temperature information from BMU 402 via SMBus terminals 417, 418. During battery system charging operations, control logic 460 of EC/KBC 431 uses this received sensed temperature information in combination with current/temperature relationship 462 to control via SMBus the magnitude of charging current Ich provided to battery system 420 by battery charging current source.

Figure 6:
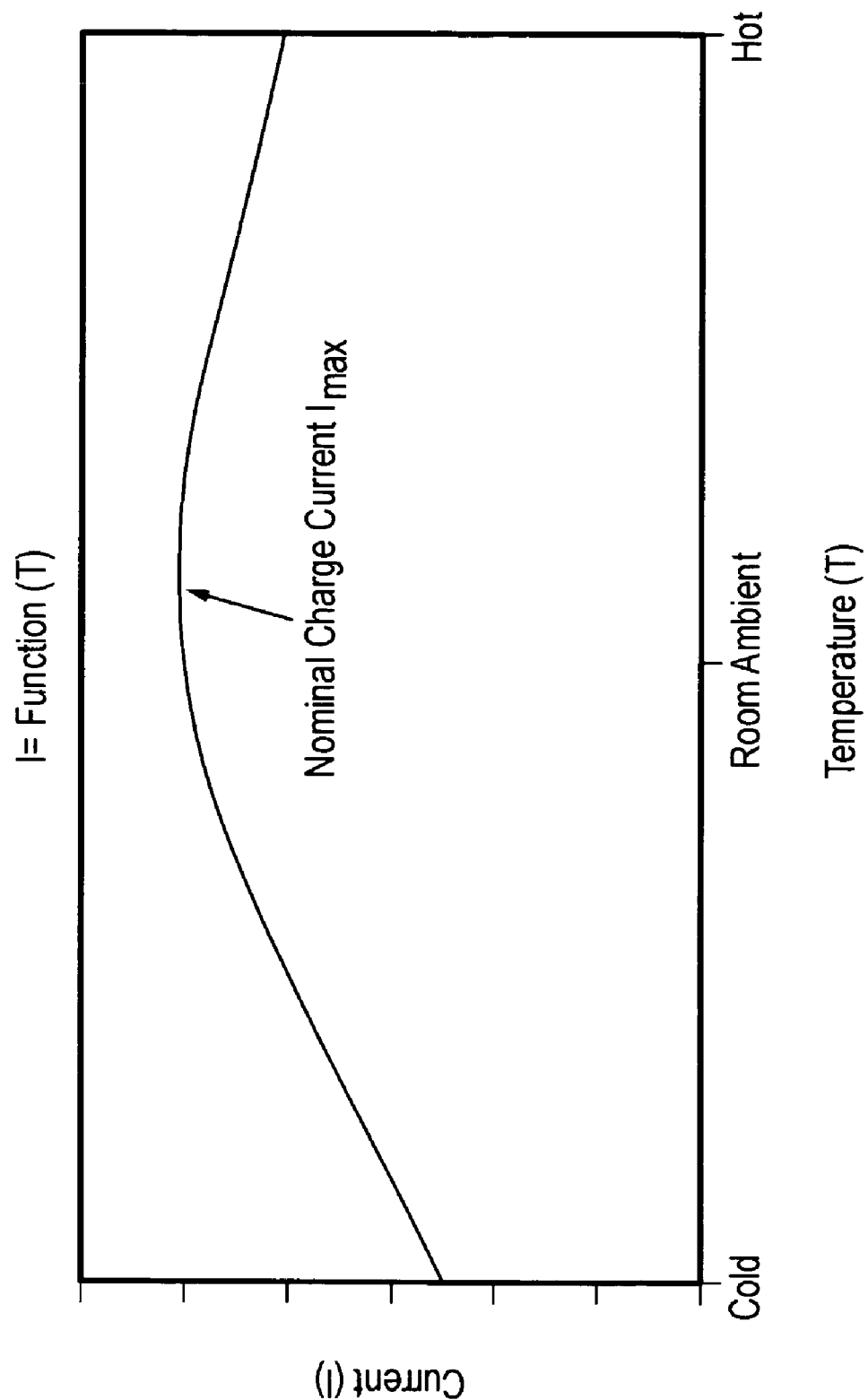
FIG. 6 illustrates a temperature-dependent charge current regulation algorithm expressed as battery charge current as a function of ambient temperature according to one exemplary embodiment of the disclosed systems and methods.

FIG. 6 shows one conceptual exemplary embodiment of a temperature-dependent charge current regulation algorithm (e.g., which may be implemented as current/temperature relationship 462 of FIG. 4 or FIG. 5) in which values of battery charge current (Ich) may be determined based on values of temperature (T) using the following function:

$$Ich = \text{Function} (T)$$

A temperature-dependent current regulation algorithm such as illustrated in FIG. 6 may be implemented, for example, to control battery charging current for a portable information handling system, such as notebook computer, that is moved between areas of different ambient temperatures. In FIG. 6 charge current (Ich) monotonically increases as ambient temperature changes from a cold ambient temperature environment (e.g., about 0° C.) to a room ambient temperature environment (e.g., from about 24° C. to about 28° C. in one embodiment) and then to hot ambient temperature environment (e.g., about 50° C.). In the exemplary embodiment of FIG. 6, charge current (Ich) monotonically increases before peaking at a maximum charge current value ($I_{max}$) around room ambient temperature, then monotonically drops as the ambient temperature environment gets hotter. Advantageously, such a temperature-dependent current regulation algorithm may be used to provide increased battery cell capacity degradation mitigation effects as ambient temperature gets increasingly adverse. It will be understood that the illustrated relationship between temperature and current shown in FIG. 6 is exemplary only, and that other types of relationships are possible, e.g., relationships where values of charge current (Ich) increase or decrease non-monotonically with changes in values of temperature (T), relationships where values of charge current (Ich) oscillate or otherwise vary up and down with changes in values of temperature (T), etc.

Charge current (Ich) control value versus temperature (T) data of a temperature-dependent current regulation algorithm such as illustrated in FIG. 6 may be digitized into table form as shown in Table 1 below.

TABLE 1

| Ambient Temperature, ° C. | Charge Current Control Value, % of $I_{max}$ |
|---|---|
| 0 | 50 |
| 2 | 52 |
| 4 | 55 |
| ... | ... |
| 22 | 95 |
| 24 | 100 |
| 26 | 100 |
| 28 | 100 |
| 30 | 97 |
| ... | ... |
| 50 | 80 |

Table 1 presents charge current control values that are expressed as a function of maximum charge current value ($I_{max}$) over an exemplary ambient temperature range of from 0° C. to 50° C., with the value of $I_{max}$ being determined by battery specifications. For purposes of simplicity and to save space, Table 1 has been presented herein without showing temperature and charge current control value data points that are present between 4° C. and 22° C., and between 30° C. and 50° C. With regard to the exemplary embodiment of Table 1, it will be understood that other temperature ranges (e.g., wider, narrower, and/or different temperature ranges) are possible, as desired or necessary, to fit a particular battery charging application.

Charge current control values may be expressed in any form (e.g., percentage or fraction of maximum charge current ($I_{max}$), actual charge current value, etc.) suitable for use to control the desired value of charge current (Ich) to be provided to battery cell/s for charging at a given temperature. The number of charge current control values may vary from as few as two charge current control value points (corresponding to two different ambient temperatures) up to the number of charge current control values that may be generated using a continuous function (e.g., by equation). In one exemplary embodiment, values of charge current (Ich) may be set to zero at extreme temperatures (e.g., temperatures of greater than about 70° C. for purposes of safety.

It will be understood that charge current control values versus temperature (T) data may be derived in any suitable manner, including by arbitrary or estimated selection of one or more reduced current values that correspond to extreme ambient temperature operating conditions. However, in one exemplary embodiment, charge current control values versus temperature (T) data may be empirically derived by measurement of battery cell/s degradation characteristics in the laboratory. One example of a procedure for such an empirical measurement is as follows:

1. Determine battery cycle life requirements (i.e., the desired or needed battery life for a given battery cycle), and the ambient temperature range of interest (e.g., the anticipated ambient temperature range to which the battery will be exposed).

2. Run charge/discharge battery cycle life testing on a given battery following the battery cycle life requirements in step 1 to determine battery capacity over multiple cycles at various ambient temperatures of interest (e.g., by cycling the battery at different temperatures from a relatively low ambient temperature to a relatively high ambient temperature that cover the ambient temperature range of interest).

Figure 8:
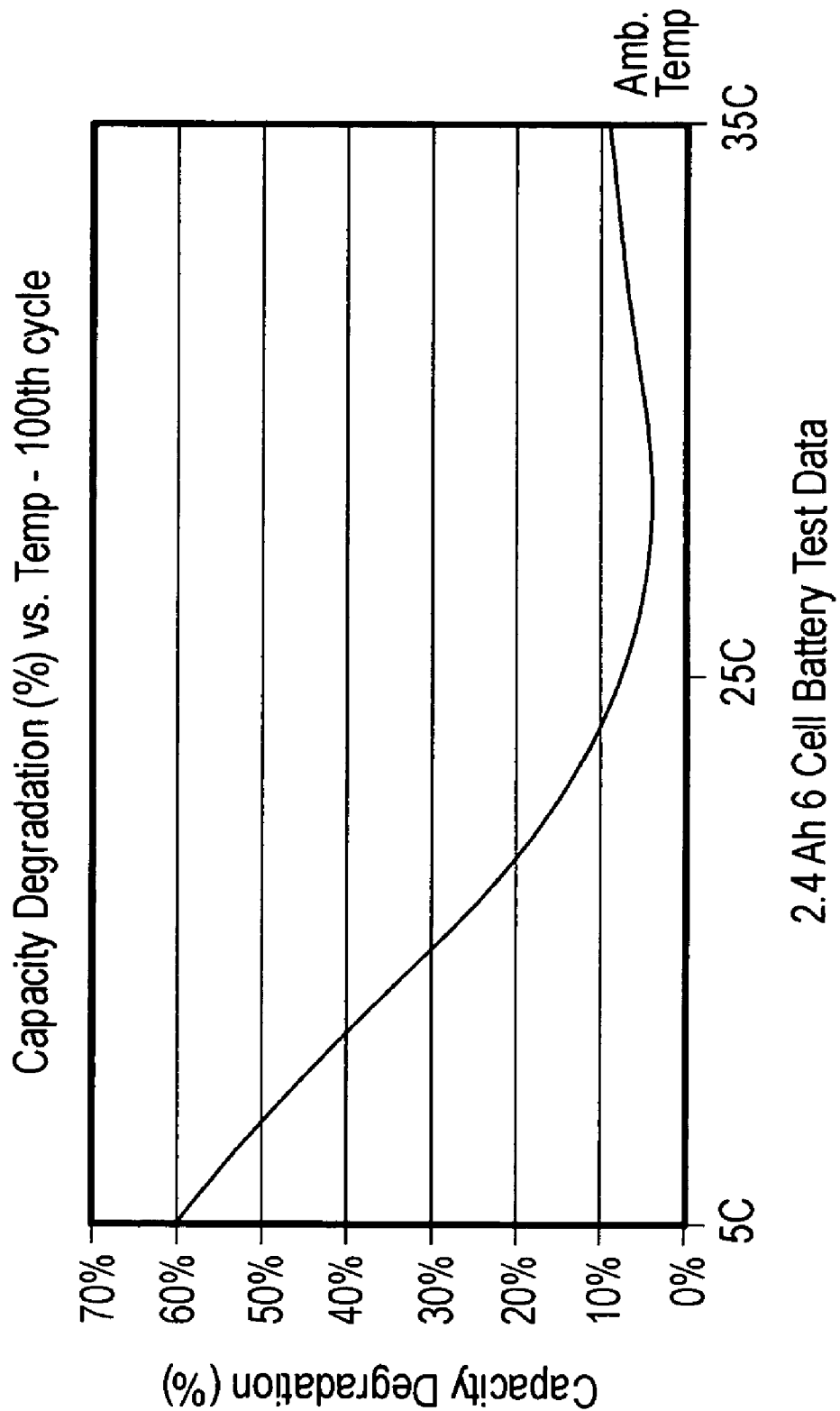
FIG. 8 shows battery capacity degradation as a function of ambient temperature.

3. Based on the data acquired in step 2, generate a Capacity Degradation Rate versus Temperature curve (or table of Capacity Degradation Rate versus Temperature values), for example, as illustrated in FIG. 8.

4. From the Capacity Degradation Rate versus Temperature data of step 3, determine at which ambient temperatures the capacity degradation characteristics of the given battery needs to be improved to satisfy the battery cycle life requirements of step 1.

5. Determine adjusted (reduced) charge current values for those ambient temperatures determined to need improvement in step 4 in order to improve the battery capacity degradation characteristics of the given battery over multiple charge/discharge cycles for those ambient temperatures. Magnitude of charge current reduction at a given ambient temperature may be arbitrary, estimated, or may be based on empirical charge/discharge battery cycle life testing experiments or other analysis on the given battery to determine a charge current control value, e.g., a charge current value that improves or maximizes the battery cycle life at that given ambient temperature.

6. Based on step 5, charge current control values versus temperature (T) data may be generated and digitalized for computerized applications, e.g., such as shown and described in relation to FIG. 6 and Table 1.

Figure 1:
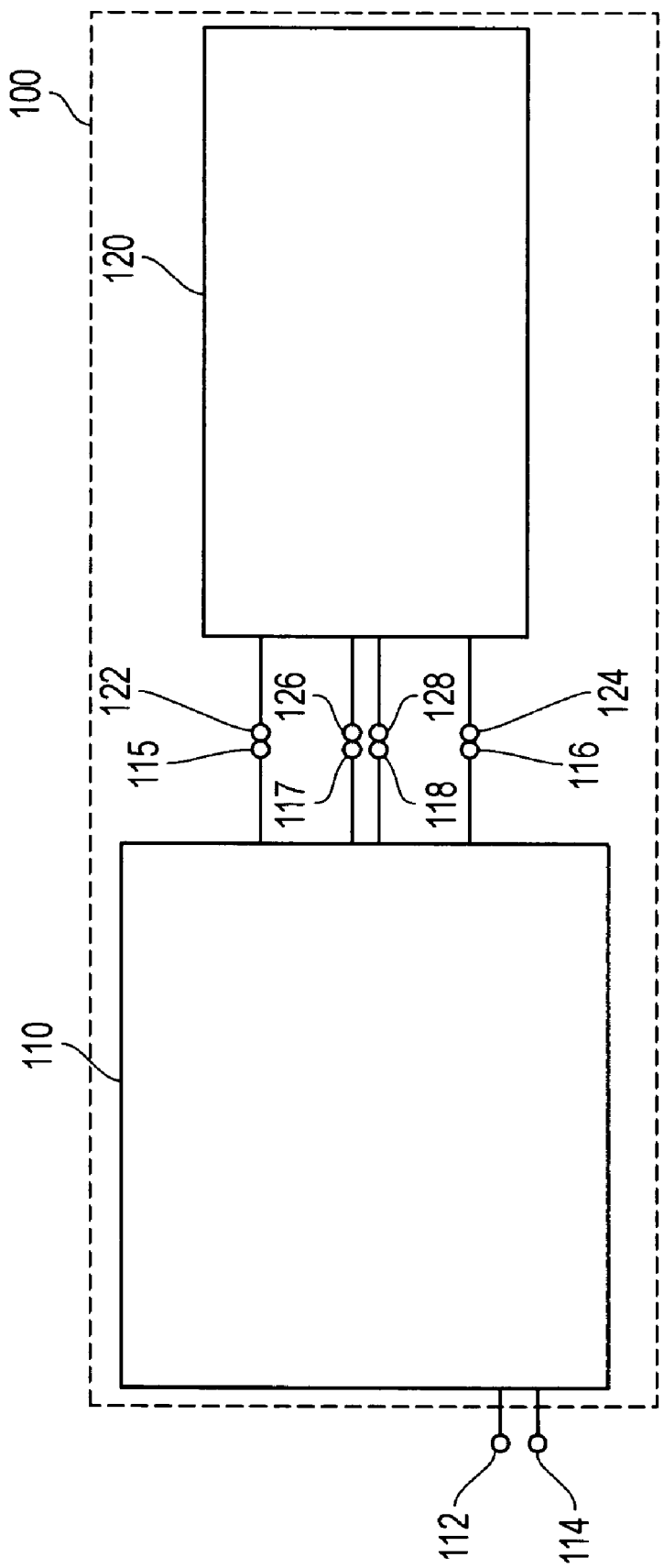
FIG. 1 is a block diagram of a conventional portable electronic device and battery charging apparatus.
Figure 2:
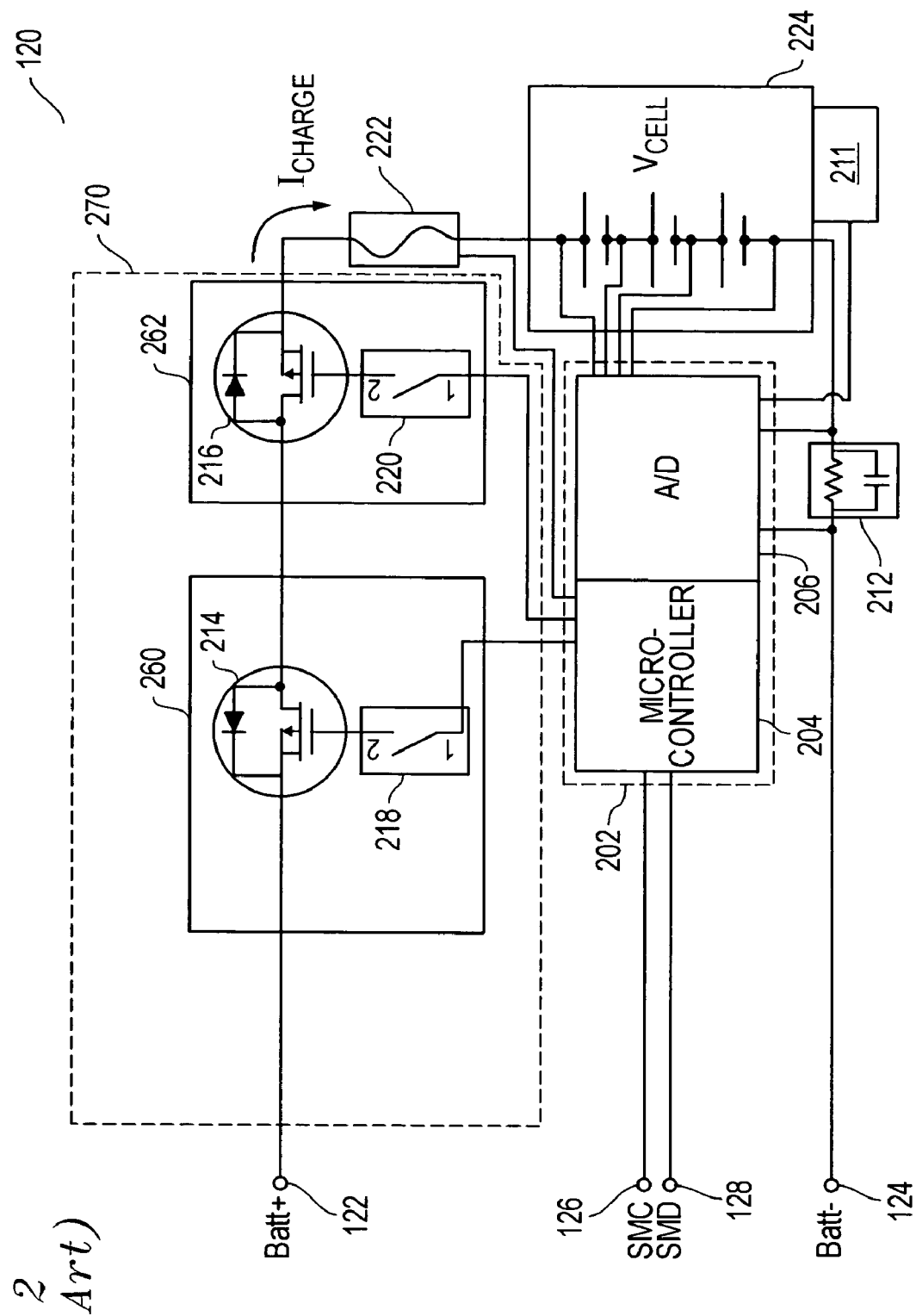
FIG. 2 is a block diagram of a conventional lithium ion battery system.
Figure 3:
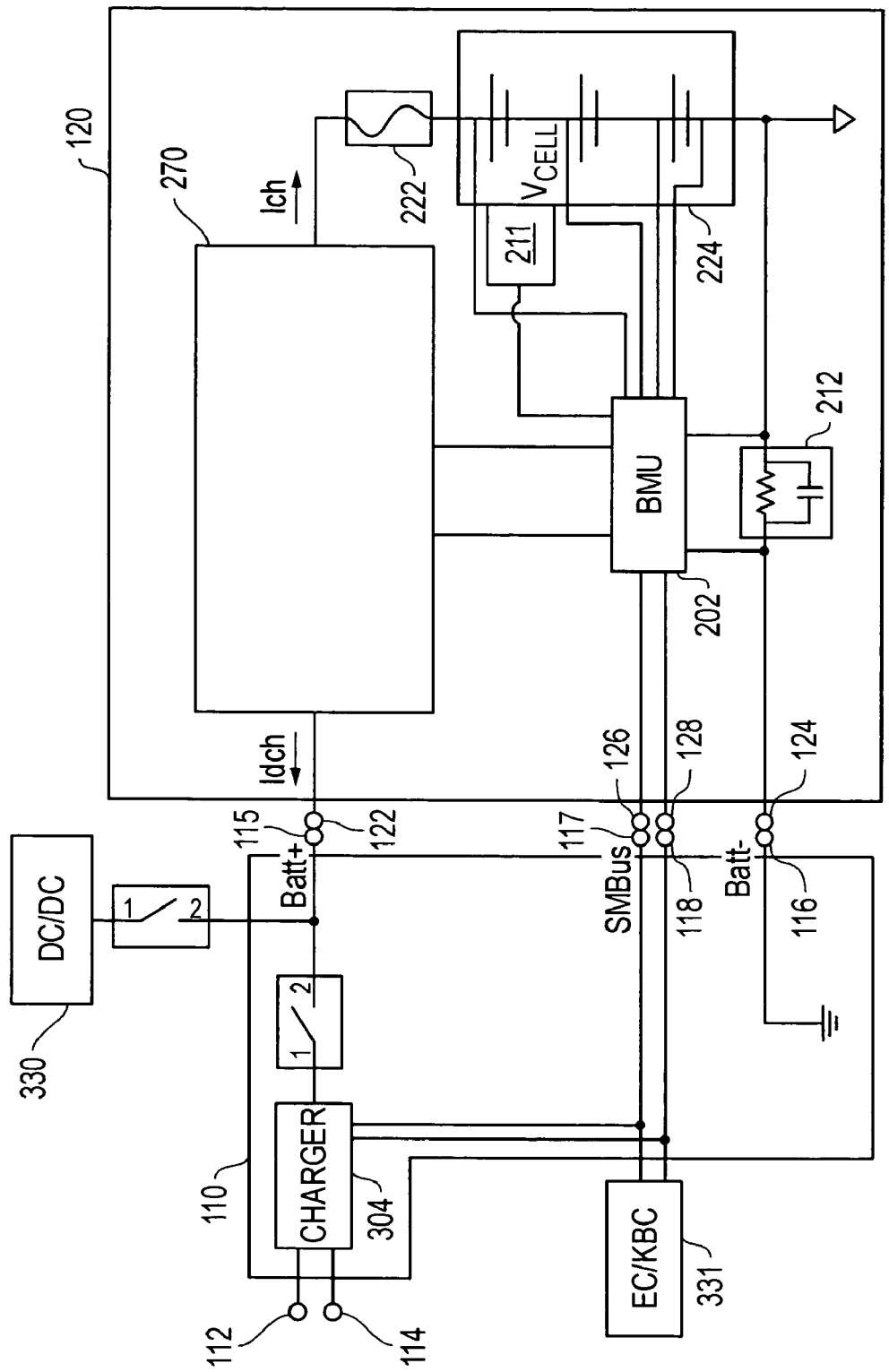
FIG. 3 is a block diagram of a conventional lithium ion battery system.
Figure 7A:
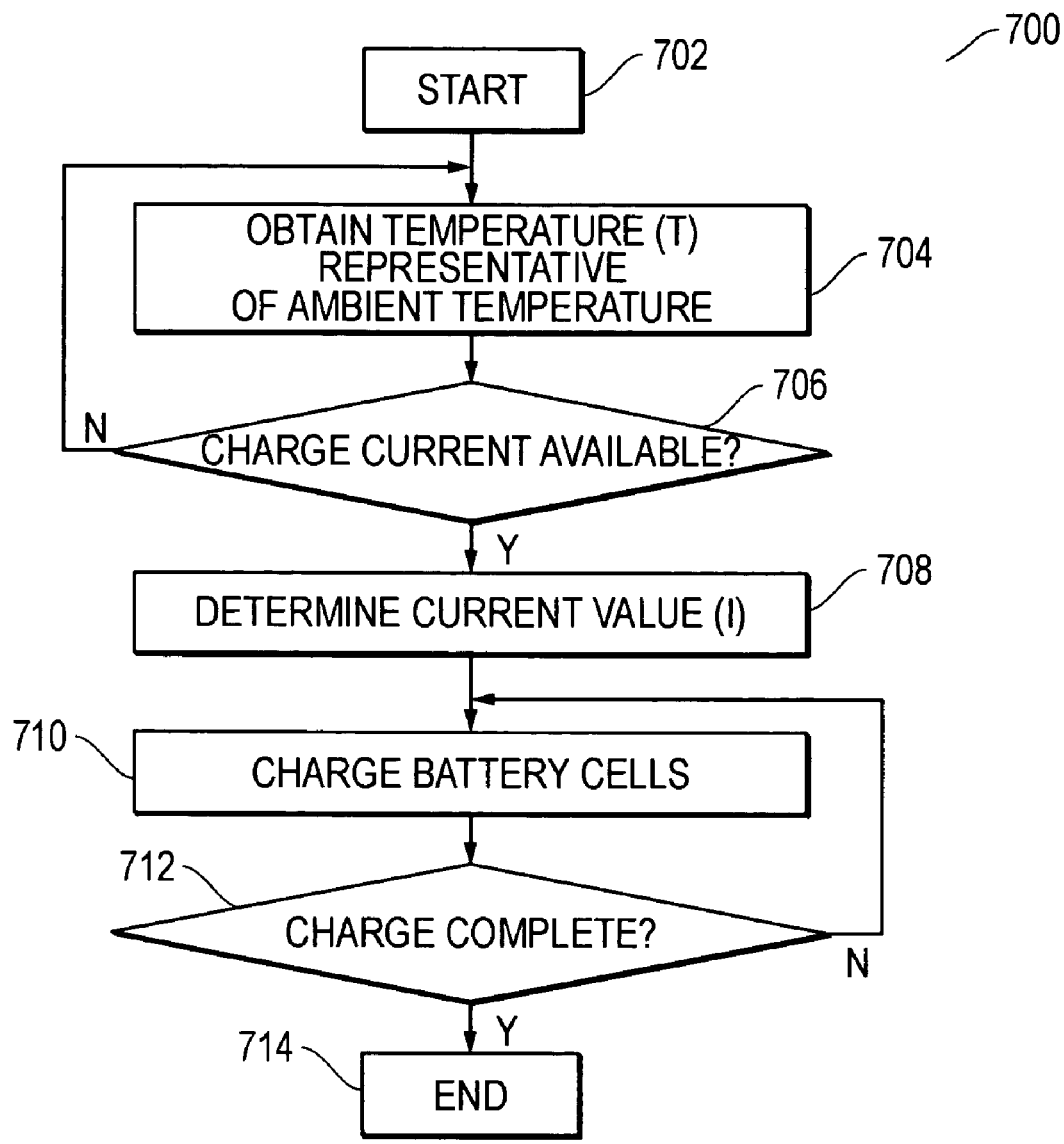
FIG. 7A shows methodology according to one exemplary embodiment of the disclosed systems and methods.

FIG. 7A illustrates one exemplary embodiment of methodology 700 as it may be implemented (e.g., by control logic 460 of FIG. 4, 5; or by 202 of FIG. 3; or by 402 of FIG. 5) to reduce battery capacity degradation by implementing a temperature-dependent charging algorithm (e.g., such as current/temperature relationship 462 of FIGS. 4, 5) to control charging of a smart or dumb battery during a single battery charging cycle, i.e., a single period of continuous charging time for a battery that is at least partially discharged from its full capacity. In one embodiment, methodology 700 may be employed to integrate a temperature-dependent charging algorithm into a portable information handling system, e.g., such as integrated into the BIOS of a notebook computer.

When implemented using the exemplary configuration of FIG. 4, methodology 700 starts in step 702 when it is determined (e.g., based on measured voltage of battery cell/s 408) that battery cell/s 408 require charging and a battery charge cycle is initiated. Methodology then proceeds to step 704 where sensed temperature information is obtained, e.g., system BIOS (e.g., running on EC/KBC 431) of FIG. 5 may retrieve sensed temperature information from BMU 402. In one embodiment, step 704 may be accomplished by measuring temperature of battery cell/s 408 prior to supplying charging current to battery cell/s 408 in order to obtain a temperature that is representative of ambient temperature (i.e., before temperature of battery cell/s 408 is affected by charging). Thus, the disclosed systems and methods may be implemented by measuring a temperature representative of ambient temperature, for example, by either directly measuring ambient temperature conditions of the environment to which battery cell/s are exposed (e.g., with an ambient temperature sensor that directly measures temperature of the environment external to the battery cell/s), or by measuring the temperature of the battery cell/s themselves prior to charging and when the temperature of the battery cell/s is substantially equalized to the surrounding environment or is equal to the surrounding environment, e.g., after any preceding charge cycle and immediately before providing charging current for the present charge cycle. It will be understood that even when temperature of the battery cell/s has not reached complete equilibrium with the ambient temperature of the surrounding environment (e.g., battery cell/s still retain heat from a previous charging cycle), benefit of the disclosed systems and methods may still be realized.

In step 706, the presence of available charge current is verified (e.g., active AC adapter is present to supply current to battery charging current source via current supply terminals 412, 414 of FIG. 5). If charge current is not available (e.g., AC adapter not present or active), then methodology 700 loops back and step 704 repeats until presence of available charge current is verified. When available charge current is verified in step 706, methodology 700 proceeds to step 708 where charge current control value is determined based on value of temperature sensed in step 704, e.g., using current/temperature relationship 462 of FIG. 5. In one exemplary embodiment, this may be done by looking up charge current control value from a look-up table such as described and shown in relation to Table 1. Battery cell/s 408 are then charged in step 710 by controlling battery charging current source to supply a constant value of charge current (Ich) based on charge current control value determined in step 708. As shown, charging continues based on this same charge current control value until it is determined in step 712 that battery cell/s 408 are charged (e.g., based on achieving a specified charged battery cell voltage), at which point methodology 700 terminates in step 714 and the battery charge cycle is ended. Methodology 700 may repeat when it is determined that battery cell/s 408 once again need charging and another battery charge cycle is initiated.

It will be understood that methodology 700 is exemplary only, and that methodologies including any combination of greater, fewer and/or alternative steps may be employed that are suitable for controlling battery cell charge current based on the ambient temperature conditions to which battery cell/s of a battery are exposed. For example, it is alternatively possible that methodology 700 may loop back from step 712 to step 704 until it is determined in step 712 that charging is completed, i.e., so that charge current (Ich) is repetitively adjusted based on changes in ambient temperature during a given charging cycle. Such an embodiment may be implemented, for example, in cases where ambient temperature conditions to which battery cell/s of a battery are exposed is directly measured (rather than the temperature of the battery cell/s themselves) and is substantially not affected by battery cell temperature effects induced by battery charging current.

Methodology 700 of FIG. 7A may be advantageously employed in combination with a temperature-dependent current regulation algorithm such as illustrated and described in relation to FIG. 6 to address the fact that, besides temperature, charge current is another factor that has significant impacts upon battery capacity degradation over charge/discharge cycles i.e., the smaller is the charge current, the less capacity degradation. Thus, when an adverse temperature environment (e.g., either cold or hot adverse temperature environment) is detected, the temperature-dependent current regulation algorithm may be used to compute out and control a smaller charge current output to the battery to mitigate the negative impacts of the adverse temperature.

Figure 7B:
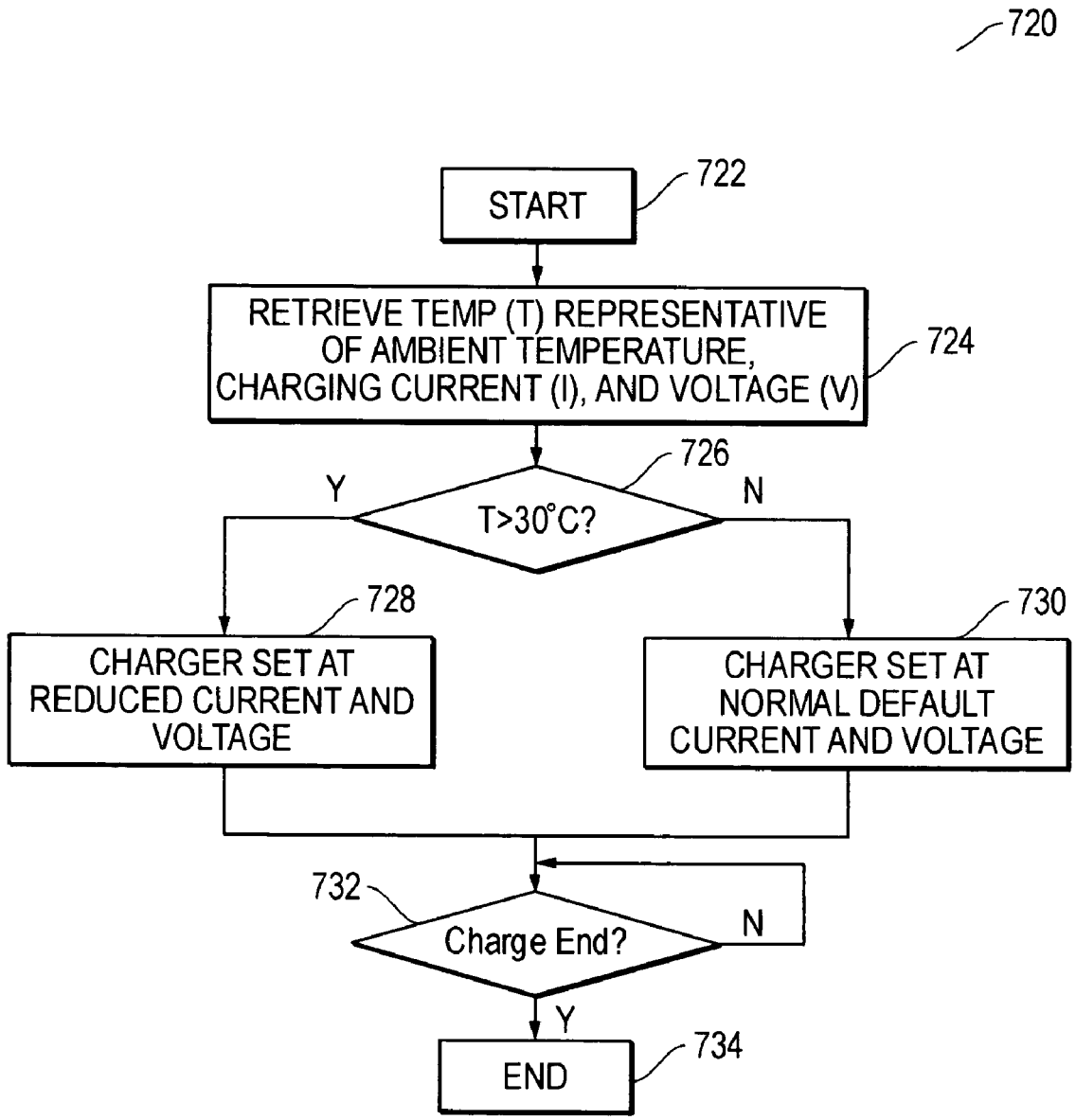
FIG. 7B shows methodology according to one exemplary embodiment of the disclosed systems and methods.

FIG. 7B illustrates another exemplary embodiment (i.e., methodology 720) as it may be implemented (e.g., by control logic 460 of FIG. 4, 5) to reduce battery capacity degradation under the particular case of hot ambient temperature conditions using another exemplary temperature-dependent charging algorithm to control charging of a smart or dumb battery during a single battery charging cycle. In one embodiment, methodology 720 may be employed using software (e.g., including ROM-based software such as firmware) and a notebook computer BIOS to control a charger of a portable information handling system. FIG. 7B further shows how charging voltage may also be controlled (e.g., reduced) under adverse ambient temperature conditions.

When implemented using the exemplary configuration of FIG. 4, methodology 720 starts in step 722 when it is determined (e.g., based on measured voltage of battery cell/s 408) that battery cell/s 408 require charging and a battery charging cycle is initiated. Methodology then proceeds to step 724 where sensed temperature information representative of ambient temperature, charging current and battery voltage is obtained, e.g., system BIOS (e.g., running on EC/KBC 431) of FIG. 5 may retrieve this information from BMU 402 via SMBus. In step 726, it is determined if the present temperature representative of ambient temperature is greater than a specified maximum temperature, in this case 30° C. If the present temperature representative of ambient temperature is determined in step 726 to not be greater than the specified maximum temperature then the charge current and charge voltage are set to normal default charge current and charge voltage values in step 730, and methodology 720 proceeds to step 732 where charging operations continue at the constant value of current set in step 730 until the battery cell/s 408 are fully charged and methodology 720 ends in step 734. However, if it is determined in step 726 that the present temperature representative of ambient temperature is greater than the specified minimum temperature (e.g., 30° C.) then the charge current and charge voltage are set to a reduced value (e.g., 50% of normal default charge current and 50% of normal default charge voltage) in step 728.

With regard to FIG. 7B, it will be understood that similar methodology may be implemented in an alternative embodiment to reduce battery capacity degradation under the particular case of cold ambient temperature conditions, e.g., by determining in step 726 if the present temperature representative of ambient temperature is less than a specified minimum temperature (e.g., less than 10° C.) and, if so, then reducing the charge current and charge voltage to a reduced value (e.g., 50% of normal default charge current and 50% of normal default charge voltage) in step 728. And, if not, then setting the charge current and charge voltage to normal default charge current and charge voltage values in step 730.

Still referring to FIG. 7B, methodology 720 then proceeds to step 732 where charging operations continue at the constant value of current set in step 730 until the battery cell/s 408 are fully charged (e.g., based on achieving a specified charged battery cell voltage) and methodology 720 ends in step 734 where the battery charge cycle is terminated. Methodology 720 may repeat when it is determined that battery cell/s 408 once again need charging in another battery charge cycle. Similar to methodology 700 of FIG. 7A, it will be understood that methodology 720 of FIG. 7B is exemplary only, and that methodology 720 may loop back from step 732 to step 724 until it is determined in step 732 that charging is completed (e.g., in cases where ambient temperature conditions to which battery cell/s of a battery are exposed is directly measured in step 724). Moreover, in another embodiment, step 228 of methodology 720 may be implemented to only reduce charge current and not charge voltage.

FIG. 8 shows battery capacity degradation as a function of ambient temperature as measured at the $100^{th}$ discharge cycle in the laboratory for a 2.4 Ah 6 cell battery that has been charged using a fixed rate charge current of about 3.9 amperes for each battery cycle and for all temperatures. As may be seen from the measured data of FIG. 8, the battery exhibits peak cycle life performance within its operational temperature range at around room ambient temperature. Further, both cold and hot ambient temperature environments have negative impacts upon battery cycle life.

Figure 9:
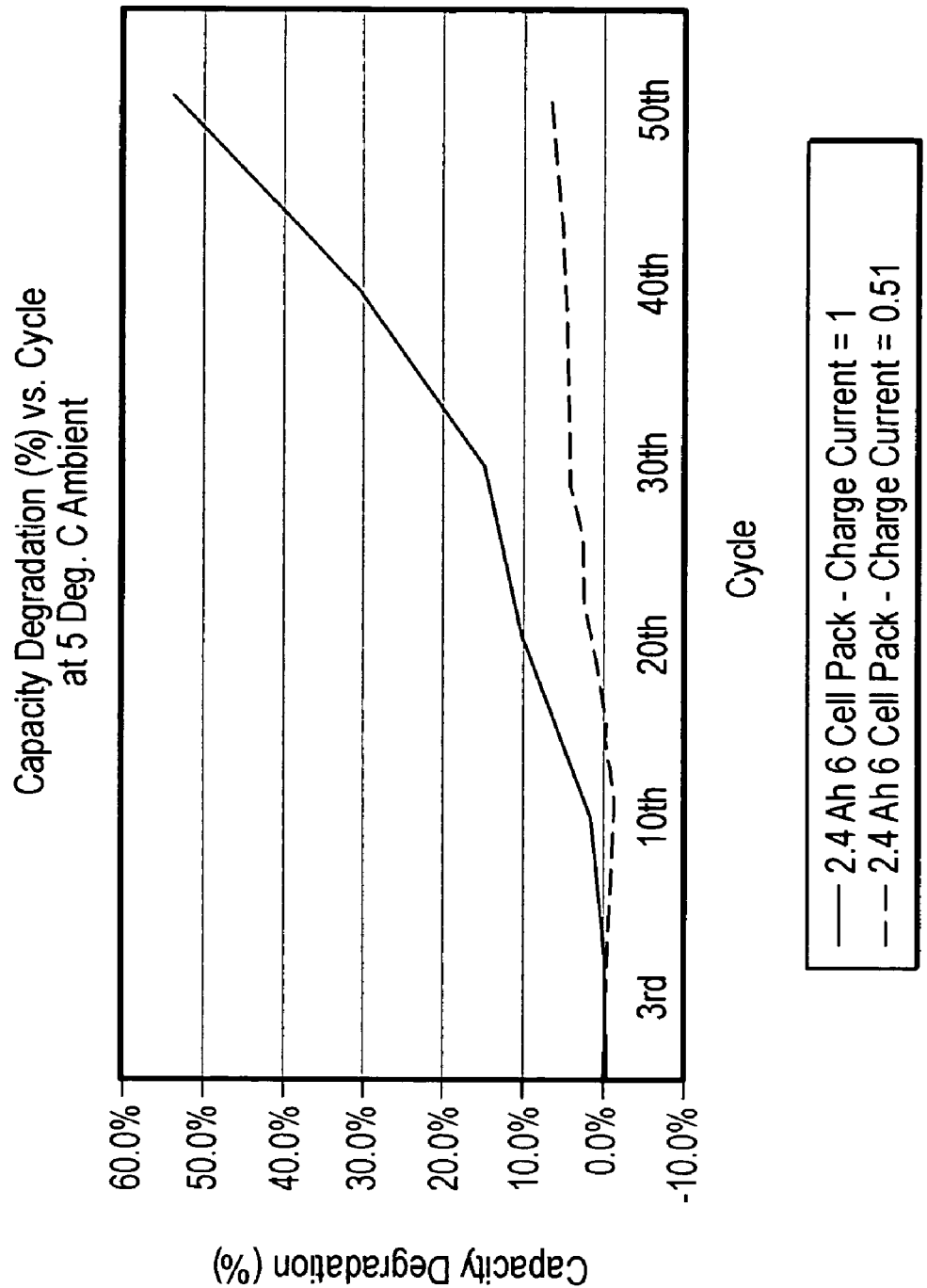
FIG. 9 shows battery capacity degradation as a function of charge cycles.

FIG. 9 shows battery capacity degradation as a function of charge cycles as measured in the laboratory for a 2.4 Ah 6 Cell battery that has been cycled by charging and discharging under ambient temperature conditions of 5° C. FIG. 9 presents two sets of batter capacity degradation data for comparison, a first set of data obtained by charging the battery at 5° C. with a maximum charging current ($I_{max}$) of 3.9 amperes, and a second set of data obtained by charging the battery at 5° C. with 50% of the maximum charging current (0.5 $I_{max}$). As may be seen from the data in FIG. 9, reducing the maximum charging current by half at 5° C. ambient temperature reduces the capacity degradation from 53.5% to 6.4% (i.e., for about 8 times improvement) over 50 cycles.

With regard to the data shown in FIGS. 8 and 9, it will be understood that different battery pack brand/models and different battery cell technologies may have different battery capacity degradation characteristics, which may be measured in the laboratory. Thus, characteristics of a temperature-dependent algorithm function (e.g., such as illustrated and described in relation to FIG. 6 and Table 1) may be adjusted (e.g., to be steeper or flatter) as desired or needed to fit the characteristics of a given battery.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method of controlling charge current provided to one or more battery cells during a charge cycle, comprising:
sensing a temperature representative of an ambient temperature to which said one or more battery cells are exposed during said charge cycle;
determining a value of charge current to be provided to said one or more battery cells during said charge cycle using a temperature-dependent current regulation algorithm and based on said sensed temperature; and
providing said determined value of charge current to said one or more battery cells as a constant charge current during said charge cycle;
wherein said temperature-dependent current regulation algorithm comprises a plurality of charge current control values, or wherein said temperature-dependent algorithm is implemented by software, or a combination thereof; and
wherein said method comprises determining a value of charge current to be provided to said one or more battery cells during said charge cycle using a temperature-dependent current regulation algorithm and based only on a sensed temperature representative of ambient temperature to which said one or more battery cells are exposed during said charge cycle.

2. The method of claim 1, wherein said one or more battery cells comprise a part of a smart battery system of a portable information handling system; and wherein said sensed temperature is a temperature of said one or more battery cells that is sensed after any preceding charge cycle and prior to providing said determined value of charge current to said one or more battery cells and prior to initiating a charging cycle that will result in any warming of said one or more battery cells.

3. The method of claim 2, further comprising using control logic implemented in firmware of said portable information handling system to determine said value of charge current to be provided to said one or more battery cells, and to control providing said determined value of charge current to said one or more battery cells during said charge cycle.

4. The method of claim 2, wherein said temperature-dependent current regulation algorithm comprises a first charge current control value corresponding to a first given temperature and a second charge current control value corresponding to a second given temperature; wherein said first given temperature is less than said second given temperature; and wherein said first charge current control value is used to determine a first value of charge current that is less than a second value of charge current determined using said second charge current control value.

5. The method of claim 4, wherein said temperature-dependent current regulation algorithm further comprises a third charge current control value corresponding to a third given temperature; wherein said third given temperature is greater than said second given temperature; and wherein said third charge current control value is used to determine a third value of charge current that is less than a second value of charge current determined using said second charge current control value.

6. The method of claim 2, wherein said temperature-dependent current regulation algorithm comprises empirically derived information.

7. The method of claim 2, further comprising determining a value of charge voltage to be provided to said one or more battery cells during said charge cycle based on said sensed temperature.

8. A method of minimizing battery capacity degradation by controlling charge current provided to one or more battery cells during a charge cycle, comprising:
determining a value of charge current to be provided to said one or more battery cells during said charge cycle based on a temperature representative of an ambient temperature to which said one or more battery cells are exposed; and
providing said determined value of charge current to said one or more battery cells during said charge cycle;
wherein said determined value of charge current comprises a first charge current value if said sensed temperature corresponds to a first given temperature, and wherein said determined value of charge current comprises a second charge current value if said sensed temperature corresponds to a second given temperature, said first given temperature being greater than said second given temperature, and said first value of charge current being less than said second value of charge current; and
wherein said first charge current value is a charge current value at which a magnitude of degradation of the capacity of said one or more battery cells at said first given temperature is reduced over a given number of multiple charge cycles as compared to a magnitude of degradation of the capacity of said one or more battery cells experienced at said second charge current value and at said first given temperature over the same said given number of multiple charge cycles.

9. The method of claim 8, wherein said one or more battery cells comprise one or more battery cells of a portable information handling system; and wherein said method further comprises empirically deriving said first charge current value by charge/discharge battery cycle life testing to determine that said first charge value is a charge current value at which a magnitude of degradation of the capacity of said one or more battery cells at said first given temperature is reduced over a given number of multiple charge cycles as compared to a magnitude of degradation of the capacity of said one or more battery cells experienced at said second charge current value and at said first given temperature over the same said given number of multiple charge cycles.

10. The method of claim 8, wherein said one or more battery cells comprise a part of a smart battery system of a portable information handling system; and wherein said sensed temperature is a temperature of said one or more battery cells that is sensed after any preceding charge cycle and prior to providing said determined value of charge current to said one or more battery cells and prior to initiating a charging cycle that will result in any warming of said one or more battery cells.

11. The method of claim 10, further comprising using control logic implemented in firmware of said portable information handling system to determine said value of charge current to be provided to said one or more battery cells, and to control providing said determined value of charge current to said one or more battery cells during said charge cycle.

12. The method of claim 10, wherein said determined value of charge current comprises a third charge current value if said sensed temperature corresponds to a third given temperature, said third given temperature being less than said second given temperature, and said third value of charge current being less than said second value of charge current; and wherein said third charge current value is a charge current value at which a magnitude of degradation of the capacity of said one or more battery cells at said third given temperature is reduced over a given number of multiple charge cycles as compared to a magnitude of degradation of the capacity of said one or more battery cells experienced at said second charge current value and at said third given temperature over the same said given number of multiple charge cycles.

13. The method of claim 10, further comprising determining a value of charge voltage to be provided to said one or more battery cells during said charge cycle based on said sensed temperature.

14. A battery charging system configured to be coupled to one or more battery cells, said battery charging system comprising:
   a battery charging current source configured to provide controllable and variable charging current to said one or more battery cells; and
   control logic configured to determine a value of charge current to be provided to said one or more battery cells during a charge cycle using a temperature-dependent current regulation algorithm and based on a sensed temperature representative of ambient temperature to which said one or more battery cells are exposed during said charge cycle;
   wherein said control logic is configured to control said battery charging current source to provide said determined value of charge current to said one or more battery cells as a constant charge current during said charge cycle;
   wherein said temperature-dependent current regulation algorithm comprises a plurality of charge current control values, or wherein said control logic is implemented by software, or a combination thereof; and
   wherein said control logic is configured to determine a value of charge current to be provided to said one or more battery cells during a charge cycle using a temperature-dependent current regulation algorithm and based only on a sensed temperature representative of ambient temperature to which said one or more battery cells are exposed during said charge cycle.

15. The system of claim 14, wherein said one or more battery cells comprise a part of a smart battery system of a portable information handling system; wherein said control logic is implemented in firmware of said portable information handling system; and wherein said sensed temperature is a temperature of said one or more battery cells that is sensed after any preceding charge cycle and prior to providing said determined value, of charge current to said one or more battery cells and prior to initiating a charging cycle that will result in any warming of said one or more battery cells.

16. The system of claim 15, wherein said temperature-dependent current regulation algorithm comprises a first charge current control value corresponding to a first given temperature and a second charge current control value corresponding to a second given temperature; wherein said first given temperature is less than said second given temperature; and wherein said control logic is configured to use said first charge current control value to determine a first value of charge current that is less than a second value of charge current determined using said second charge current control value.

17. The system of claim 16, wherein said temperature-dependent current regulation algorithm further comprises a third charge current control value corresponding to a third given temperature; wherein said third given temperature is greater than said second given temperature; and wherein said control logic is configured to use said third charge current control value to determine a third value of charge current that is less than a second value of charge current determined using said second charge current control value.

18. The system of claim 15, wherein said temperature-dependent current regulation algorithm comprises empirically derived information.

19. The system of claim 15, wherein said control logic is further configured to determine a value of charge voltage to be provided to said one or more battery cells during said charge cycle based on said sensed temperature, and to control said battery charging current source to provide said determined value of charge voltage to said one or more battery cells during said charge cycle.

20. A portable information handling system comprising said battery charging system of claim 15.

21. A battery charging system configured to be coupled to one or more battery cells, said battery charging system comprising:
   a battery charging current source configured to provide controllable and variable charging current to said one or more battery cells; and
   control logic configured to determine a value of charge current to be provided to said one or more battery cells during said charge cycle based on a temperature representative of an ambient temperature to which said one or more battery cells are exposed, and to provide said determined value of charge current to said one or more battery cells during said charge cycle;
   wherein said determined value of charge current comprises a first charge current value if said sensed temperature corresponds to a first given temperature, and wherein said determined value of charge current comprises a second charge current value if said sensed temperature corresponds to a second given temperature, said first given temperature being greater than said second given temperature, and said first value of charge current being less than said second value of charge current; and wherein said first charge current value is a charge current value at which a magnitude of degradation of the capacity of said one or more battery cells at said first given temperature is reduced over a given number of multiple charge cycles as compared to a magnitude of degradation of the capacity of said one or more battery cells experienced at said second charge current value and at said first given temperature over the same said given number of multiple charge cycles.

22. A portable information handling system comprising said battery charging system of claim 21; and wherein said sensed temperature is a temperature of said one or more battery cells that is sensed after any preceding charge cycle and prior to providing said determined value of charge current to said one or more battery cells and prior to initiating a charging cycle that will result in any warming of said one or more battery cells.

23. method of claim 8, wherein said method comprises determining a value of charge current to be provided to said one or more battery cells during said charge cycle based only on a temperature representative of an ambient temperature to which said one or more battery cells are exposed.

24. system of claim 21, wherein said control logic is configured to determine a value of charge current to be provided to said one or more battery cells during said charge cycle based only on a temperature representative of an ambient temperature to which said one or more battery cells are exposed, and to provide said determined value of charge current to said one or more battery cells during said charge cycle.

25. The method of claim 1, wherein said sensed temperature is external ambient air temperature.

26. The system of claim 14, wherein said sensed temperature is external ambient air temperature.

27. The method of claim 8, wherein said method further comprises empirically deriving said first charge current value by:
1) determining battery cycle life requirements and an ambient temperature range to which said one or more battery cells are to be exposed;
2) performing charge/discharge battery cycle life testing on said one or more battery cells following said battery cycle life requirements to determine capacity of said one or more battery cells over multiple cycles at various ambient temperatures of interest;
3) generating a relationship of capacity degradation rate as a function of temperature based on the data acquired in step 2;
4) determining one or more identified ambient temperatures at which said measured capacity degradation of said one or more battery cells needs to be improved to satisfy said battery cycle life requirements of step 1; and
5) determining one or more reduced charge current values for said one or more identified ambient temperatures of step 4 that are operative to improve the battery capacity degradation characteristics of said one or more battery cells over multiple charge/discharge cycles for said one or more identified ambient temperatures, said first charge current value being one of said determined one or more reduced charge current values.

28. The method of claim 8, further comprising:
determining a value of charge current and a value of charge voltage to be provided to said one or more battery cells during said charge cycle based on a temperature representative of an ambient temperature to which said one or more battery cells are exposed; and
providing said determined value of charge current and charge voltage to said one or more battery cells during said charge cycle;
wherein said determined values of charge current and charge voltage comprise a first charge current value and a first charge voltage value if said sensed temperature corresponds to a first given temperature, and wherein said determined values of charge current and charge voltage comprise a second charge current value and second charge voltage value if said sensed temperature corresponds to a second given temperature, said first given temperature being greater than said second given temperature, said first value of charge current being less than said second value of charge current, said first value of charge voltage being less than said second value of charge voltage; and
wherein said first and charge current value and said first charge voltage value are current and voltage values at which a magnitude of degradation of the capacity of said one or more battery cells at said first given temperature is reduced over a given number of multiple charge cycles as compared to a magnitude of degradation of the capacity of said one or more battery cells experienced at said second charge current value and said second charge voltage at said first given temperature over the same said given number of multiple charge cycles.

29. The system of claim 21, further comprising:
a battery charging current source configured to provide controllable and variable charging current and variable charging voltage to said one or more battery cells; and
control logic configured to determine a value of charge current and charge voltage to be provided to said one or more battery cells during said charge cycle based on a temperature representative of an ambient temperature to which said one or more battery cells are exposed, and to provide said determined value of charge current and charge voltage to said one or more battery cells during said charge cycle;
wherein said determined values of charge current and charge voltage comprise a first charge current value and a first charge voltage value if said sensed temperature corresponds to a first given temperature, and wherein said determined values of charge current and charge voltage comprise a second charge current value and second charge voltage value if said sensed temperature corresponds to a second given temperature, said first given temperature being greater than said second given temperature, said first value of charge current being less than said second value of charge current, said first value of charge voltage being less than said second value of charge voltage; and
wherein said first and charge current value and said first charge voltage value are current and voltage values at which a magnitude of degradation of the capacity of said one or more battery cells at said first given temperature is reduced over a given number of multiple charge cycles as compared to a magnitude of degradation of the capacity of said one or more battery cells experienced at said second charge current value and said second charge voltage at said first given temperature over the same said given number of multiple charge cycles.

* * * * *

UNITED STATES PATENT AND TRADEMARK OFFICE
CERTIFICATE OF CORRECTION

PATENT NO. : 7,615,969 B2 Page 1 of 1
APPLICATION NO. : 11/494192
DATED : November 10, 2009
INVENTOR(S) : Meng et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 445 days.

Signed and Sealed this

Nineteenth Day of October, 2010

David J. Kappos
*Director of the United States Patent and Trademark Office*